Dec. 9, 1924.
M. DANDREA
MEAT SAW
Filed Feb. 11, 1924
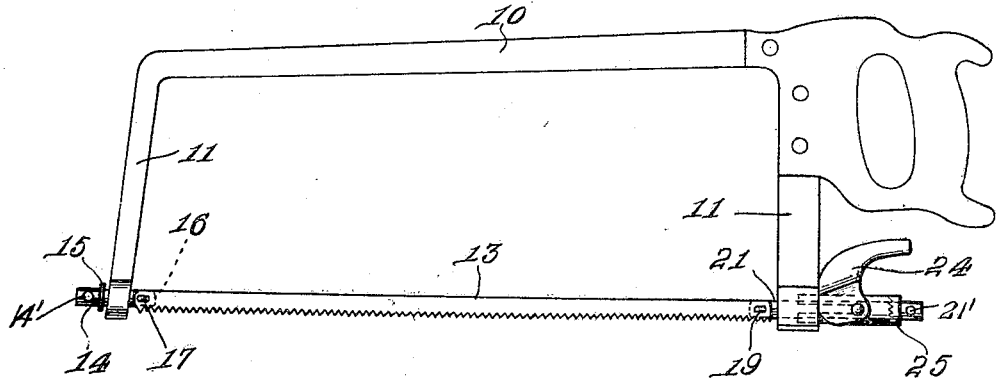
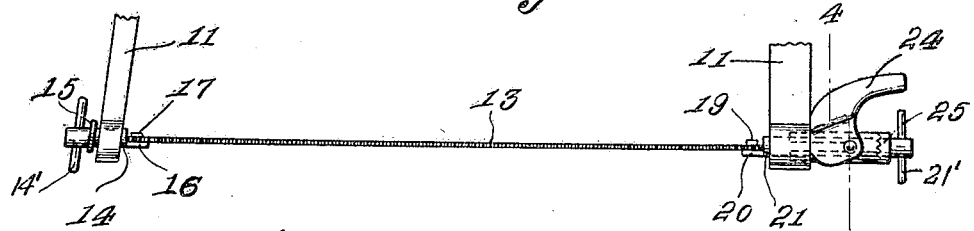
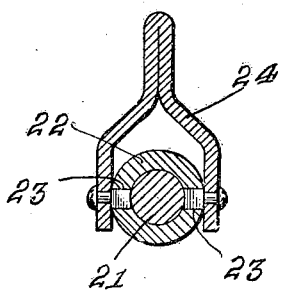
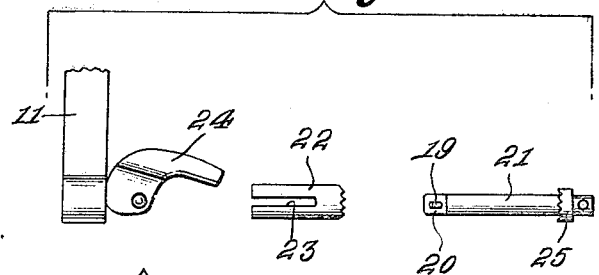
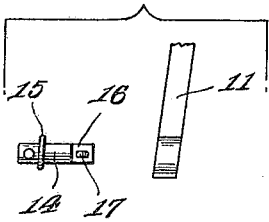

Patented Dec. 9, 1924.

1,518,488

UNITED STATES PATENT OFFICE.

MIKE DANDREA, OF MILLBURN, NEW JERSEY.

MEAT SAW.

Application filed February 11, 1924. Serial No. 692,109.

*To all whom it may concern:*

Be it known that I, MIKE DANDREA, a citizen of the United States, residing at Millburn, in the county of Essex and State of New Jersey, have invented new and useful Improvements in Meat Saws, of which the following is a specification.

This invention relates to meat saws or the like, and contemplates a structure wherein the saw blade can be turned upon the saw frame and arranged at any angle with relation thereto, and subsequently fastened in its adjusted position, so that the saw can operate in one plane with the frame arranged in another position.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein:

Figure 1 is a view of the saw constructed in accordance with the present invention.

Figure 2 is a fragmentary view showing the saw blade arranged at an angle with relation to the frame.

Figure 3 is a detail view of the parts forming the fastening means for the saw blade for holding it in its adjusted position.

Figure 4 is a sectional view taken on line 4—4 of Figure 2.

Figure 5 is a view showing a fragmentary portion of one end of the frame and the member received thereby for connecting the adjacent end of the blade with the frame.

Referring to the drawing in detail, 10 represents the frame of the saw which is of ordinary well known construction, the parallel ends 11 of which are provided with aligned openings as shown. The saw blade 13 is arranged between these ends, and has one end connected with the member 14 which is passed through one of the openings of the saw frame and provided with a collar 15. This member is of course mounted for rotation in the frame thereby permitting the saw to be adjusted in the manner above stated. The member is provided with a reduced extremity 16 which supports a hook 17 adapted to be received by an opening in the saw blade. Carried by the member 14 is a cross pin 14' adapted to be grasped to turn the member 14.

The other end of the blade is provided with a similar opening to receive the hook like element 19 carried by the reduced extremity 20 of a member 21 which is also adapted to be passed through the opening in the adjacent end of the saw frame. However at this end of the saw the member 21 is passed through a sleeve 22 bifurcated as at 23 to receive a cam shaped lever 24 which is fulcrumed in the bifurcated portion of the sleeve. The sleeve is slipped upon the member 21, and both of these elements as a unit are then passed through the opening in the adjacent end of the saw frame. From an inspection of Figure 1, it will be noted that the member 21 is longer than the sleeve to project beyond the opposed ends thereof, and that the sleeve is mounted for sliding movement upon the member and has one end bearing against the collar 25 on the member 21. It is by reason of this construction that the blade can be loosened to allow it to be rotated with relation to the frame 10, and thus permit the blade to be arranged at any desired angle with relation to the frame, and subsequently held in fixed relation to the frame in its given position. To loosen the blade for this purpose, it is only necessary to swing the cam shaped lever upwardly, and after the blade has been adjusted to subsequently move the latter downwardly. Of course as the lever is moved downwardly, it contacts the adjacent end of the frame, slides the sleeve on the member against the collar 25 and in this way tensions the blade so that it is held in its adjusted position. Consequently, the saw can be arranged at one angle for use with the frame arranged at a different angle, so that the frame may occupy an out of the way position so that it will not come in contact with or interfere in any way with the use of the saw while the latter is sawing through the material being dealt with. The member 21 is also provided with a cross pin 21' for the convenience of operating said member as described.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

A saw comprising a substantially U-shaped frame having openings adjacent the ends thereof, a member mounted for rotation in one end of the frame, a saw blade having its adjacent end connected with said member, a sleeve received by the opening at the other end of the frame, a member passed through said sleeve and connected with the adjacent end of the saw blade, and capable of rotation with reference to the first mentioned member whereby the blade can be arranged at any angle with relation to the frame, a collar carried by the second mentioned member and against which one end of the sleeve bears, and a cam shaped lever pivoted on said sleeve for moving it toward and away from said collar, and bearing against the adjacent end of the frame when the sleeve contacts the collar to hold the blade in its given position.

In testimony whereof I affix my signature.

MIKE DANDREA.